Nov. 3, 1936.　　　　　C. F. SKOOG　　　　　2,059,669
BICYCLE STEERING MEMBER
Filed May 23, 1935
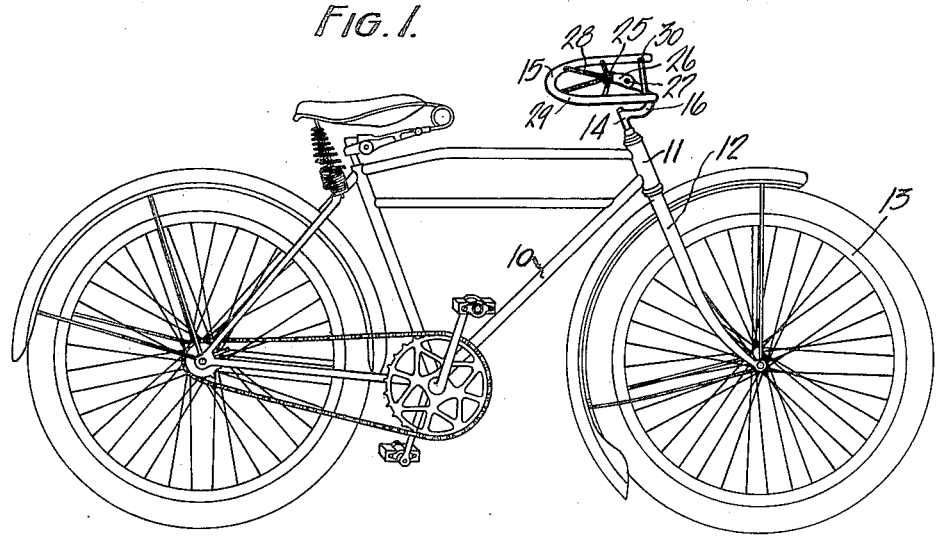
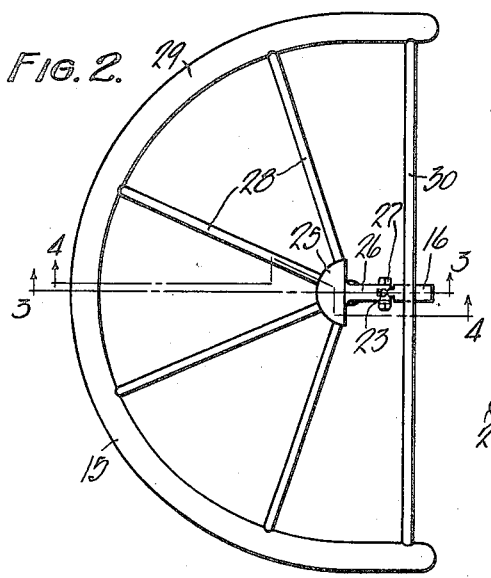
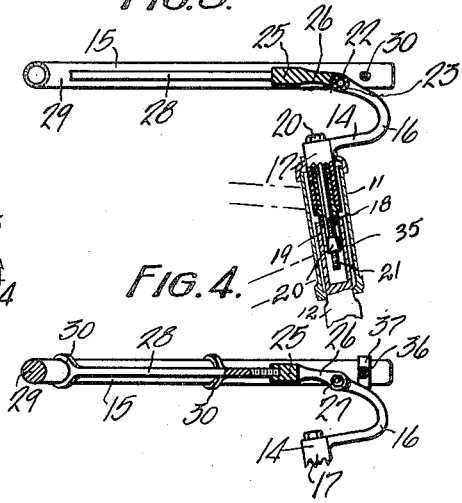
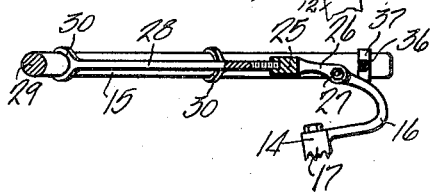
INVENTOR.
CARL F. SKOOG.
BY Oltsch & Knoblock,
ATTORNEYS.

Patented Nov. 3, 1936

2,059,669

UNITED STATES PATENT OFFICE 2,059,669

BICYCLE STEERING MEMBER

Carl F. Skoog, South Bend, Ind.

Application May 23, 1935, Serial No. 23,013

6 Claims. (Cl. 208—115)

This invention relates to bicycle steering members, and has for its principal object to provide a device of this character having a novel hand grip.

A further object is to provide a steering member of this character constructed to serve as a support for packages or as an auxiliary seat.

A further object is to provide a device of this character with novel mounting and adjusting means.

A further object is to provide a device of this character with novel reinforcing means.

Other objects will be apparent from the description and the appended claims.

In the drawing:—

Figure 1 is a perspective view of a bicycle equipped with my new steering member.

Figure 2 is a top plan view of the steering member.

Figure 3 is a longitudinal vertical sectional view of the steering member taken on line 3—3 of Figure 2.

Figure 4 is a longitudinal vertical sectional view of a modified form of steering member taken on line 4—4 of Figure 2.

Referring to the drawing, and particularly to Figures 1 to 3, the numeral 10 designates a bicycle frame having a front tubular housing portion 11 receiving the upper end of the steering fork 12 mounting the front or steering wheel 13, which fork has operative connection with a mounting member 14 for the steering member 15. The mounting member 14 comprises a goose neck 16 mounted on the upper end of a tubular member 17 mounted in the frame part 11 and within which is mounted a tubular member 18 slitted at 19 adjacent its lower end and adapted to operatively engage a fork carried tube 35. A bolt 20 whose head bears on the upper end of member 17 and which passes axially therein, mounts a frusto-conical spreader 21 fitting into the slitted end of tube 18 to spread the latter for tight frictional engagement with tube 35 and resultant operative interconnection of fork 12 with member 14 upon tightening of the bolt 20. The upper end of the goose neck 16 is provided with a disc tongue 22 provided with a plurality of radial ridges 23 in the opposite side faces thereof.

My new steering member 15 comprises a solid metal head 25, preferably of segmental shape, provided with a forwardly downwardly inclined arm 26 which is bifurcated at its end and provided with radial grooves in the inner faces of said forks, said forks receiving disc tongue 22 therebetween with the ridges and grooves interfitting to rigidly position said head relative to member 16 upon tightening of the bolt and nut 27 interconnecting said parts. A plurality of rigid bars or spokes 28 are welded or otherwise secured at their inner ends to head 25 and diverge therefrom in equiangular balanced relation rearwardly and laterally of said head. A U-shaped hand grip member 29, such as a metal tube, having a semi-circularly bent rearwardly disposed central portion, is welded or otherwise secured to the outer ends of bars 28. The end portion of the hand grip member extends forwardly in substantially parallel relation to terminate in forwardly spaced relation to the arm 26, and a transverse brace 30 is welded or otherwise secured to said end portions, in forwardly spaced relation to head 25.

The steering member is thus provided with an arcuate hand grip portion and is supported remote from said hand grip portion. The assembly is firmly supported and reinforced by the radial arms connecting the same with the mounting head, and by the cross brace interconnecting the free ends of the hand grip, the former serving to prevent deforming of the hand grip upon application of stress thereto, and the latter cooperating with the former and serving to close the front end of the hand grip independently of the mounting head. These supporting and reinforcing members lie in a common plane, so that they also serve to form a support for packages or an auxiliary seat for riders without interference from the mounting means of the device, which means is positioned below the common plane of said supporting members. It will also be seen that the provision of the goose neck 16 and inclined arm 26 permit the head 25 and the curved portion of the hand grip to be positioned concentrically of the turning axis of the steering wheel, and yet provide space for access to the bolt 20.

A modified form of the device is illustrated in Figure 4 wherein the hand grip 29 is formed of wood or other non-metallic material. In this construction the diverging arms 28 are preferably threaded into head 25 and are provided at their outer ends with yokes 35 for operative connection with the hand grip. The front cross brace is preferably formed of sheet metal of U-shaped cross-section as illustrated at 36, the opposite parts of said U-sectioned member being separated at the ends thereof to provide straps 37 adapted to encircle and be secured to the forward ends of said hand grip. Thus this modified construction possesses the same combination and arrangement of parts as the preferred construction, the specific structure being changed only to accommodate the use of a non-metallic hand grip.

I claim:—

1. A bicycle steering member comprising a head having a forwardly downwardly inclined arm adapted for connection with a steering element, a U-shaped hand grip including a rearwardly disposed curved central portion and forwardly extending end portions, a plurality of bars secured to said head and diverging therefrom, said bars being secured to said hand grip, and a transverse brace secured at its ends to the ends of said hand grip and disposed forwardly of said head and above the level of said inclined arm.

2. A bicycle steering member comprising a U-shaped hand grip, a head, a plurality of spokes secured at their opposite ends to said head and said hand grip, a downwardly inclined securing arm carried by said head, a cross brace interconnecting the free ends of said hand grip disposed in spaced relation to said head and above the level of said securing arm, the axes of said spokes and cross brace lying in a common plane.

3. A bicycle steering member comprising a substantially U-shaped hand grip, equi-angularly converging bars secured to said hand grip, a head secured to the inner ends of said bars, a brace interconnecting the free ends of said hand grip and spaced from said head, said bars and brace lying in a common plane, and a downwardly inclined arm carried by said head for mounting said steering member and provided with friction locking faces provided with a plurality of off-sets.

4. A bicycle steering member comprising a U-shaped hand grip, a head in the plane of said hand grip, a plurality of spaced bars interconnecting said hand grip and head, a downwardly inclined arm projecting from said head, and means adapted to be rotatably mounted on a bicycle frame and including an off-set, and adjustable means for locking said arm to said off-set.

5. A bicycle steering member comprising a hand grip including an arcuate portion, a head concentric of said arcuate portion, spokes interconnecting said head and hand grip, a downwardly inclined arm carried by said head, means for rotatably mounting said member on a bicycle frame including a laterally off-set upwardly extending member, and adjustable means for locking said last named member and said arm to position said head in vertically spaced substantially concentric relation to said means.

6. A bicycle steering member comprising a hand grip including an arcuate portion, a head concentric of said arcuate portion, spokes interconnecting said head and hand grip, a downwardly inclined arm carried by said head, means for rotatably mounting said member on a bicycle frame including a laterally off-set upwardly extending member, said arm and off-set having a pivotal tongue and groove interconnection including bearing faces provided with interlocking radial off-sets, and means for clamping said grooved part on said tongue.

CARL F. SKOOG.